(12) United States Patent
Nauta

(10) Patent No.: US 8,043,502 B2
(45) Date of Patent: Oct. 25, 2011

(54) WATER PITCHER FILTER

(75) Inventor: Phillip Nauta, Stouffville (CA)

(73) Assignee: UV Corporation, Stouffville, Ontario (CA)

( * ) Notice: Subject to any disclaimer, the term of this patent is extended or adjusted under 35 U.S.C. 154(b) by 0 days.

(21) Appl. No.: 12/194,036

(22) Filed: Aug. 19, 2008

(65) Prior Publication Data

US 2009/0057220 A1    Mar. 5, 2009

Related U.S. Application Data

(63) Continuation-in-part of application No. 11/960,018, filed on Dec. 19, 2007.

(60) Provisional application No. 61/007,899, filed on Aug. 29, 2007.

(51) Int. Cl.
*B01D 27/02* (2006.01)
*C02F 1/00* (2006.01)

(52) U.S. Cl. ......... 210/232; 210/282; 210/473; 210/477

(58) Field of Classification Search .................. None
See application file for complete search history.

(56) References Cited

U.S. PATENT DOCUMENTS

| | | | | | |
|---|---|---|---|---|---|
| 434,570 | A | * | 8/1890 | Sargent | 210/282 |
| 773,946 | A | * | 11/1904 | Langill | 210/266 |
| 2,630,227 | A | * | 3/1953 | Rodwell | 210/265 |
| 3,327,859 | A | * | 6/1967 | Pall | 210/266 |
| 3,339,743 | A | * | 9/1967 | Bealle | 210/256 |
| 3,747,767 | A | * | 7/1973 | Hankammer | 210/282 |
| 3,823,824 | A | * | 7/1974 | Close | 210/86 |
| 4,149,454 | A | * | 4/1979 | Kemp | 99/295 |
| 4,151,092 | A | * | 4/1979 | Grimm et al. | 210/256 |
| 4,306,971 | A | * | 12/1981 | Hankammer | 210/282 |
| 4,505,727 | A | * | 3/1985 | Cullen et al. | 96/147 |
| 4,528,095 | A | * | 7/1985 | Byrne | 210/206 |
| 4,623,457 | A | * | 11/1986 | Hankammer | 210/237 |
| 4,666,600 | A | * | 5/1987 | Hankammer | 210/266 |
| 4,741,828 | A | * | 5/1988 | Alhauser et al. | 210/264 |
| 4,749,481 | A | * | 6/1988 | Wheatley | 210/282 |
| 4,764,274 | A | * | 8/1988 | Miller | 210/232 |

(Continued)

FOREIGN PATENT DOCUMENTS

EP    1106225 A1    6/2001

(Continued)

OTHER PUBLICATIONS

Wikipedia Article on Polylactic Acid; 5 pages; downloaded Nov. 22, 2010.*

(Continued)

*Primary Examiner* — Robert James Popovics
(74) *Attorney, Agent, or Firm* — Bereskin & Parr LLP S.E.N.C.R.L., s.r.l.; Philip C. Mendes da Costa

(57) ABSTRACT

A filter assembly for a household water filtration apparatus, and a method for filtering water using a household water filtration apparatus are provided. The filter assembly comprises a through-flow cartridge, which has an accessible cavity. The cartridge is removably received in the household water filtration apparatus. The filter assembly further comprises a water permeable enclosure that contains filter media, which is removably received in the accessible cavity. The method comprises opening a through-flow cartridge, depositing a filter packet in the cartridge, closing the cartridge, depositing the cartridge in the household water filtration apparatus, and passing water through the cartridge. Alternately, the filter assembly may be fabricated using polylactic acid.

2 Claims, 11 Drawing Sheets

U.S. PATENT DOCUMENTS

| | | | |
|---|---|---|---|
| 4,776,956 A * | 10/1988 | Gannaway | 210/282 |
| 4,828,692 A * | 5/1989 | Peranio | 210/123 |
| 4,895,648 A * | 1/1990 | Hankammer | 210/188 |
| 4,948,499 A * | 8/1990 | Peranio | 210/180 |
| 4,969,996 A * | 11/1990 | Hankammer | 210/282 |
| D312,863 S * | 12/1990 | Hankammer | D23/209 |
| 4,995,975 A * | 2/1991 | Jacquot et al. | 210/266 |
| 5,049,272 A * | 9/1991 | Nieweg | 210/266 |
| 5,076,922 A * | 12/1991 | DeAre | 210/282 |
| D325,768 S * | 4/1992 | Hankammer | D23/212 |
| 5,139,666 A * | 8/1992 | Charbonneau et al. | 210/264 |
| D332,028 S * | 12/1992 | Melamed et al. | D7/317 |
| 5,190,643 A * | 3/1993 | Duncan et al. | 210/85 |
| 5,205,932 A * | 4/1993 | Solomon et al. | 210/264 |
| D336,760 S * | 6/1993 | Raunkjaer | D23/209 |
| D337,691 S * | 7/1993 | Raunkjaer | D7/317 |
| 5,225,078 A * | 7/1993 | Polasky et al. | 210/264 |
| 5,238,559 A * | 8/1993 | Nieweg | 210/264 |
| D352,212 S * | 11/1994 | Burton | D7/629 |
| 5,431,813 A * | 7/1995 | Daniels | 210/282 |
| 5,486,285 A * | 1/1996 | Feeney | 210/85 |
| 5,505,120 A * | 4/1996 | Albertson | 99/286 |
| D370,711 S * | 6/1996 | Serenko et al. | D23/209 |
| 5,536,394 A * | 7/1996 | Lund et al. | 210/87 |
| 5,536,396 A * | 7/1996 | Mudra et al. | 210/94 |
| D374,911 S * | 10/1996 | Kahana | D23/209 |
| 5,616,243 A * | 4/1997 | Levy | 210/282 |
| 5,628,897 A * | 5/1997 | Phelan | 210/94 |
| 5,637,214 A * | 6/1997 | Kahana | 210/282 |
| 5,652,008 A * | 7/1997 | Heiligman | 426/422 |
| 5,665,224 A * | 9/1997 | Levene et al. | 210/85 |
| D386,041 S * | 11/1997 | Tanner et al. | D7/319 |
| D388,655 S * | 1/1998 | Flom et al. | D7/319 |
| 5,785,844 A * | 7/1998 | Lund et al. | 210/85 |
| 5,811,004 A * | 9/1998 | Robertson et al. | 210/482 |
| D400,392 S * | 11/1998 | Robertson et al. | D7/319 |
| 5,830,360 A * | 11/1998 | Mozayeni | 210/651 |
| 5,846,418 A * | 12/1998 | Thompson et al. | 210/266 |
| 5,855,160 A * | 1/1999 | Shen | 99/279 |
| D406,003 S * | 2/1999 | Tanner et al. | D7/319 |
| 5,873,995 A * | 2/1999 | Huang et al. | 210/87 |
| 5,882,507 A * | 3/1999 | Tanner et al. | 210/85 |
| 5,900,138 A * | 5/1999 | Moretto | 210/85 |
| 5,914,045 A * | 6/1999 | Palmer et al. | 210/694 |
| 5,980,743 A * | 11/1999 | Bairischer | 210/266 |
| 5,989,424 A * | 11/1999 | Serenko et al. | 210/266 |
| 6,012,232 A * | 1/2000 | Weyrauch | 34/61 |
| 6,042,725 A * | 3/2000 | Serenko et al. | 210/266 |
| 6,053,482 A * | 4/2000 | Glenn et al. | 261/4 |
| 6,074,550 A * | 6/2000 | Hofmann et al. | 210/87 |
| 6,099,728 A * | 8/2000 | Bairischer | 210/266 |
| 6,103,114 A * | 8/2000 | Tanner et al. | 210/232 |
| 6,193,894 B1 * | 2/2001 | Hollander | 210/748.11 |
| 6,202,541 B1 * | 3/2001 | Cai | 99/286 |
| D440,110 S * | 4/2001 | Tanner et al. | D7/319 |
| 6,224,751 B1 * | 5/2001 | Hofmann et al. | 210/85 |
| 6,227,382 B1 * | 5/2001 | Cutler et al. | 210/473 |
| 6,238,552 B1 * | 5/2001 | Shannon | 210/94 |
| 6,254,768 B1 * | 7/2001 | Dulieu et al. | 210/91 |
| 6,270,822 B1 * | 8/2001 | Frazier | 426/433 |
| 6,287,456 B1 * | 9/2001 | Fish et al. | 210/85 |
| 6,290,848 B1 * | 9/2001 | Tanner et al. | 210/266 |
| D454,469 S * | 3/2002 | Jalet et al. | D7/318 |
| 6,387,260 B1 * | 5/2002 | Pimenov et al. | 210/282 |
| 6,405,875 B1 * | 6/2002 | Cutler | 210/477 |
| D459,941 S * | 7/2002 | Miller | D7/392 |
| 6,423,224 B1 * | 7/2002 | Tanner et al. | 210/247 |
| 6,428,687 B1 * | 8/2002 | Moretto | 210/100 |
| 6,440,302 B1 * | 8/2002 | Leipziger | 210/223 |
| 6,454,941 B1 * | 9/2002 | Cutler et al. | 210/266 |
| 6,475,352 B2 * | 11/2002 | Conrad | 204/176 |
| 6,478,956 B2 * | 11/2002 | Kaura | 210/232 |
| 6,485,644 B2 * | 11/2002 | Bowler | 210/282 |
| 6,524,477 B1 * | 2/2003 | Hughes | 210/282 |
| 6,550,622 B2 * | 4/2003 | Koslow | 210/490 |
| 6,565,743 B1 * | 5/2003 | Poirier et al. | 210/85 |
| 6,572,769 B2 * | 6/2003 | Rajan et al. | 210/266 |
| 6,599,427 B2 * | 7/2003 | Nohren et al. | 210/660 |
| 6,602,406 B1 * | 8/2003 | Nohren et al. | 210/136 |
| 6,638,426 B1 * | 10/2003 | Fritter et al. | 210/266 |
| 6,649,045 B2 * | 11/2003 | Tanner et al. | 210/85 |
| 6,651,824 B2 * | 11/2003 | Miller | 210/464 |
| 6,773,608 B1 * | 8/2004 | Hallett et al. | 210/748.11 |
| 6,797,160 B2 * | 9/2004 | Huang | 210/117 |
| 6,835,311 B2 * | 12/2004 | Koslow | 210/490 |
| 6,841,067 B1 * | 1/2005 | Hofmann et al. | 210/266 |
| D501,755 S * | 2/2005 | Namur | D7/397 |
| 6,860,992 B2 * | 3/2005 | Chau | 210/251 |
| 6,881,327 B2 * | 4/2005 | Tanner et al. | 210/85 |
| 6,953,523 B2 * | 10/2005 | Vandenbelt et al. | 210/85 |
| 6,953,604 B2 * | 10/2005 | Koslow | 427/244 |
| 6,959,820 B2 * | 11/2005 | Koslow | 210/489 |
| 6,998,058 B2 * | 2/2006 | Koslow | 210/764 |
| 7,008,537 B2 * | 3/2006 | Koslow | 210/257.2 |
| 7,011,753 B2 * | 3/2006 | Koslow | 210/263 |
| 7,014,759 B2 * | 3/2006 | Radford | 210/232 |
| D523,280 S * | 6/2006 | Bertulis | D7/317 |
| 7,081,225 B1 * | 7/2006 | Hollander | 210/748.11 |
| 7,107,838 B2 * | 9/2006 | Chai et al. | 73/304 R |
| 7,144,533 B2 * | 12/2006 | Koslow | 264/49 |
| 7,201,840 B2 * | 4/2007 | Tsataros et al. | 210/85 |
| 7,276,161 B2 * | 10/2007 | Rajan et al. | 210/266 |
| 7,294,277 B2 * | 11/2007 | Moretto | 210/746 |
| 7,297,283 B2 * | 11/2007 | Ali | 210/767 |
| 7,306,723 B2 * | 12/2007 | Radford | 210/232 |
| 7,309,418 B2 * | 12/2007 | Joyce et al. | 210/95 |
| 7,378,015 B2 * | 5/2008 | Rinker et al. | 210/203 |
| 7,387,729 B2 * | 6/2008 | Vandenbelt et al. | 210/284 |
| 7,396,461 B2 * | 7/2008 | Bommi et al. | 210/266 |
| 7,413,653 B2 * | 8/2008 | Powell | 210/416.3 |
| D579,515 S * | 10/2008 | Bell et al. | D23/209 |
| 7,438,799 B2 * | 10/2008 | Vandenbelt et al. | 210/85 |
| 7,476,312 B2 * | 1/2009 | Laing et al. | 210/109 |
| 7,507,338 B2 * | 3/2009 | Bommi et al. | 210/232 |
| 7,510,088 B2 * | 3/2009 | Smith et al. | 210/456 |
| D590,475 S * | 4/2009 | Bell et al. | D23/209 |
| 7,513,278 B2 * | 4/2009 | Hengsperger et al. | 141/85 |
| 7,670,479 B2 * | 3/2010 | Arett et al. | 210/85 |
| 7,678,282 B2 * | 3/2010 | Moretto | 210/746 |
| 7,708,958 B2 * | 5/2010 | Namespetra et al. | 422/300 |
| 7,713,482 B2 * | 5/2010 | Rinker et al. | 422/430 |
| 7,713,496 B2 * | 5/2010 | Harris | 422/186.3 |
| 7,959,872 B2 * | 6/2011 | Namespetra et al. | 422/300 |
| 2001/0006162 A1 * | 7/2001 | Hollander | 210/748 |
| 2001/0032822 A1 * | 10/2001 | Koslow et al. | 210/767 |
| 2002/0005377 A1 * | 1/2002 | Tanner et al. | 210/226 |
| 2002/0020673 A1 * | 2/2002 | Nohren et al. | 210/660 |
| 2002/0060175 A1 * | 5/2002 | Conrad et al. | 210/85 |
| 2002/0060176 A1 * | 5/2002 | Mierau et al. | 210/94 |
| 2002/0060177 A1 * | 5/2002 | Conrad | 210/203 |
| 2002/0060189 A1 * | 5/2002 | Conrad | 210/739 |
| 2002/0060190 A1 * | 5/2002 | Conrad | 210/739 |
| 2002/0066698 A1 * | 6/2002 | Brunner | 210/474 |
| 2002/0125187 A1 * | 9/2002 | Tanner et al. | 210/418 |
| 2002/0134715 A1 * | 9/2002 | Tanner et al. | 210/85 |
| 2002/0139746 A1 * | 10/2002 | Koslow | 210/493.1 |
| 2003/0034291 A1 * | 2/2003 | Miller | 210/244 |
| 2003/0070979 A1 * | 4/2003 | Huang | 210/469 |
| 2003/0085169 A1 * | 5/2003 | Reid | 210/435 |
| 2003/0111404 A1 * | 6/2003 | Koslow | 210/483 |
| 2003/0159979 A1 * | 8/2003 | Chau | 210/282 |
| 2003/0168401 A1 * | 9/2003 | Koslow | 210/500.25 |
| 2003/0196963 A1 * | 10/2003 | Koslow | 210/681 |
| 2003/0196964 A1 * | 10/2003 | Koslow | 210/681 |
| 2003/0201231 A1 * | 10/2003 | Koslow | 210/660 |
| 2003/0205529 A1 * | 11/2003 | Koslow | 210/660 |
| 2003/0205530 A1 * | 11/2003 | Koslow | 210/660 |
| 2003/0205531 A1 * | 11/2003 | Koslow | 210/660 |
| 2003/0213750 A1 * | 11/2003 | Koslow | 210/660 |
| 2004/0060873 A1 * | 4/2004 | Yanou et al. | 210/660 |
| 2004/0094465 A1 * | 5/2004 | Rajan et al. | 210/266 |
| 2004/0149642 A1 * | 8/2004 | Vandenbelt et al. | 210/282 |
| 2004/0149643 A1 * | 8/2004 | Vandenbelt et al. | 210/282 |
| 2004/0173507 A1 * | 9/2004 | Tanner et al. | 210/85 |
| 2005/0109683 A1 * | 5/2005 | Joyce et al. | 210/94 |
| 2005/0133427 A1 * | 6/2005 | Rinker et al. | 210/209 |
| 2005/0139540 A1 * | 6/2005 | Mierau et al. | 210/435 |

| | | | | |
|---|---|---|---|---|
| 2005/0224422 A1* | 10/2005 | Moretto | ........................ | 210/746 |
| 2005/0247609 A1* | 11/2005 | Laing et al. | ..................... | 210/109 |
| 2005/0252844 A1* | 11/2005 | Chau | ............................ | 210/282 |
| 2006/0000763 A1* | 1/2006 | Rinker et al. | ................ | 210/282 |
| 2006/0096925 A1* | 5/2006 | Roffman et al. | ............. | 210/660 |
| 2006/0157399 A1* | 7/2006 | Vandenbelt et al. | .......... | 210/282 |
| 2006/0162806 A1* | 7/2006 | Hengsperger et al. | ........... | 141/18 |
| 2006/0163148 A1* | 7/2006 | Hengsperger et al. | ........ | 210/473 |
| 2006/0163169 A1* | 7/2006 | Eckhardt et al. | .............. | 210/748 |
| 2006/0163174 A1* | 7/2006 | Namespetra et al. | ......... | 210/760 |
| 2006/0191824 A1* | 8/2006 | Arett et al. | ....................... | 210/85 |
| 2006/0226064 A1* | 10/2006 | Beckman et al. | ........... | 210/323.1 |
| 2006/0231476 A1* | 10/2006 | Vandenbelt et al. | .......... | 210/266 |
| 2006/0249442 A1* | 11/2006 | Yap et al. | ....................... | 210/470 |
| 2006/0260990 A1* | 11/2006 | Joyce et al. | ..................... | 210/85 |
| 2007/0045169 A1* | 3/2007 | Powell | ........................ | 210/416.3 |
| 2007/0108136 A1* | 5/2007 | Gold | ............................ | 210/767 |
| 2007/0125713 A1* | 6/2007 | Harris | ............................ | 210/663 |
| 2007/0209984 A1* | 9/2007 | Lev et al. | ........................ | 210/143 |
| 2007/0215536 A1* | 9/2007 | Bommi et al. | .................. | 210/282 |
| 2007/0221561 A1* | 9/2007 | Funkhouser et al. | ........... | 210/232 |
| 2007/0278141 A1* | 12/2007 | Patera et al. | .................. | 210/110 |
| 2008/0023402 A1* | 1/2008 | Rawson et al. | ............... | 210/663 |
| 2008/0023405 A1* | 1/2008 | Rawson et al. | ............... | 210/688 |
| 2008/0023406 A1* | 1/2008 | Rawson et al. | ............... | 210/688 |
| 2008/0035552 A1* | 2/2008 | Lee | ................................ | 210/335 |
| 2008/0035582 A1* | 2/2008 | Moretto | ........................ | 210/748 |
| 2008/0041790 A1* | 2/2008 | Rajan et al. | .................... | 210/669 |
| 2008/0087596 A1* | 4/2008 | Bommi et al. | .................. | 210/232 |
| 2008/0110820 A1* | 5/2008 | Knipmeyer et al. | ........... | 210/474 |
| 2008/0116146 A1* | 5/2008 | Herrington et al. | ............ | 210/748 |
| 2008/0190825 A1* | 8/2008 | Hengsperger et al. | ........... | 210/95 |
| 2008/0190827 A1* | 8/2008 | Rinker et al. | ................. | 210/101 |
| 2008/0202992 A1* | 8/2008 | Bridges et al. | .................. | 210/85 |
| 2008/0223797 A1* | 9/2008 | Reid et al. | ...................... | 210/790 |
| 2008/0257802 A1* | 10/2008 | Friel | ............................ | 210/109 |
| 2008/0302714 A1* | 12/2008 | Rajan et al. | .................... | 210/266 |
| 2008/0314808 A1* | 12/2008 | Vandenbelt et al. | ............ | 210/85 |
| 2009/0001011 A1* | 1/2009 | Knipmeyer et al. | ........... | 210/266 |
| 2009/0039028 A1* | 2/2009 | Eaton et al. | .................... | 210/679 |
| 2009/0039032 A1* | 2/2009 | Patera et al. | ................... | 210/760 |
| 2009/0057220 A1* | 3/2009 | Nauta | ............................ | 210/282 |
| 2009/0057241 A1* | 3/2009 | Nauta | ............................ | 210/767 |
| 2009/0202691 A1* | 8/2009 | Gauger | ........................... | 426/432 |
| 2009/0272682 A1* | 11/2009 | Rinker et al. | ............... | 210/198.1 |
| 2009/0314703 A1* | 12/2009 | Beach et al. | ................... | 210/232 |
| 2010/0006508 A1* | 1/2010 | Mitchell et al. | ............... | 210/669 |
| 2010/0044291 A1* | 2/2010 | Tseng | ............................ | 210/230 |
| 2010/0176037 A1* | 7/2010 | Namespetra et al. | ........... | 210/85 |
| 2010/0243582 A1* | 9/2010 | Riedel et al. | ................... | 210/767 |
| 2010/0243583 A1* | 9/2010 | Riedel et al. | ................... | 210/767 |
| 2011/0073551 A1* | 3/2011 | Reid et al. | ...................... | 210/800 |
| 2011/0084006 A1* | 4/2011 | Wu | ................................ | 210/85 |

FOREIGN PATENT DOCUMENTS

JP   2007197857 A   8/2007

OTHER PUBLICATIONS

The Canadian Office Action, dated Jan. 26, 2011, received on the corresponding Canadian Patent Application No. 2,638,921.

* cited by examiner

WATER PITCHER FILTER

CROSS-REFERENCES TO RELATED APPLICATIONS

This application claims priority from U.S. patent application Ser. No. 11/846,949 (filed on Aug. 29, 2007), which was converted to Provisional Application 61/007,899 (Petition Granted on Jan. 14, 2008); and U.S. patent application Ser. No. 11/960,018 (filed on Dec. 19, 2007), each of which is incorporated herein by reference in its entirety.

FIELD OF THE INVENTION

The invention relates to filter assemblies for a portable water filtration apparatus. More specifically, the invention relates to filter assemblies that are environmentally friendly.

BACKGROUND OF THE INVENTION

Portable water filtration apparatus, such as those sold under the Brita trade mark, include countertop water filters and faucet mounted water filters. These water filters typically include a filter assembly that includes a filtration media, such as activated carbon. These filter assemblies are fitted into the water filters. For example, a filter assembly may be fitted onto or into a funnel member coupled to a receiving container (a water reservoir) for collecting liquid, or onto a fixture coupled to a faucet wherein the water from the faucet flows through the fixture prior to being dispensed.

Known filter assemblies generally include a cartridge which houses granulated carbon. For example, U.S. Pat. No. 6,012,232 to Weyrauch and U.S. Pat. No. 6,099,728 to Bairischer describe a cartridge in the form of a closed cup, which has holes on the upper and lower portions through which water passes as it is filtered. The cup houses granulated carbon, and the holes on the upper and lower portions are covered with a sieve cloth to prevent the granulated carbon from escaping. Over time, the granulated carbon in such cartridges becomes spent, and the user must dispose of the cartridge and replace it with a new one.

SUMMARY OF THE INVENTION

In accordance with this invention, filter assemblies that are environmentally friendly are provided. Various embodiments are provided that may be used individually or in combination. Accordingly, a filter cartridge that is openable to receive a water-permeable enclosure that houses filter media, preferably lose granular filter material, is provided. Alternately, or in addition, a filter enclosure, or part thereof, that is made of polylactic acid, is provided.

Accordingly, in one broad aspect, the present invention provides a filter assembly for a portable water filtration apparatus. The filter assembly comprises a through-flow cartridge, wherein the cartridge has an accessible cavity. A water permeable enclosure is removably received in the accessible cavity. The cavity may be openable (such as by the cartridge having a moveable or removable lid) or the cartridge may be provided with an access slot though which a cartridge may be inserted. The permeable enclosure houses a filtration media. Preferably, the filter assembly is removably received in the water filtration apparatus. However, in an alternate embodiment, the cavity may be opened while the filter assembly is positioned in the water filtration apparatus. The filter media is preferably lose granular material, such as may be used to filter water which passes through the filter material due to gravity.

In another broad aspect, the present invention provides a method for filtering water using a water filter apparatus. The method comprises opening a through-flow cartridge, depositing a filter packet in the cartridge, closing the cartridge, depositing the cartridge in the portable water filtration apparatus, and passing water through the cartridge.

An advantage of these broad aspects is that as the filtration media becomes spent, the permeable enclosure may be removed from the cartridge and replaced, without requiring the replacement of the entire cartridge. The cartridge is typically comprised of plastic. Plastic is typically not biodegradable and will remain in landfill for an extended period of time. By replacing the filter media and reusing the cartridge, the amount of waste that is sent to landfills is reduced. Further, much or substantially all of the waste that is sent to land fill, namely the filter media, may be a natural source material, e.g., carbon and mineral stone.

A further advantage of the present invention is that the space required to store replacement permeable enclosures is less then the space required to store replacement cartridges. The components of a replacement cartridges are relatively inexpensive. However, the volume occupied by them has a substantial impact on the cost of shipping and warehousing the product. Accordingly, by providing replacement permeable enclosures, costs and storage space may be reduced.

In accordance with this aspect of the present invention, there is provided a filter assembly for a household water filtration apparatus, the filter assembly comprising.
  (a) a through-flow cartridge having an accessible cavity, wherein the cartridge is received in the household water filtration apparatus;
  (b) a water-permeable enclosure removably receivable in the accessible cavity; and,
  (c) the permeable enclosure housing filtration media.

In some embodiments, the through-flow cartridge is removably received in the household water filtration apparatus. In other embodiments, a portion of the through-flow cartridge is permanently secured to the household water filtration apparatus.

In some embodiments, the through flow cartridge is positioned in a gravity fed water flow passage from a feed water reservoir to a filtered water reservoir of the household water filtration apparatus.

In one embodiment, the through-flow cartridge comprises a cup having an openable lid. Preferably, the cup and the lid have mating screw threads. However, they may be moveably connected to each other by any means so as to permit access to the cavity. In some embodiments, the openable lid is accessible when a lid of the household water filtration apparatus is opened.

In another embodiment, the permeable enclosure comprises a mesh. Preferably, the mesh is non-woven. The mesh may comprise hydrophobic filaments. The mesh may be a plastic and, preferably, comprises at least one of polypropylene and nylon.

In another embodiment, the permeable enclosure has a longitudinally extending sidewall, a water permeable top, and a water permeable bottom. Preferably, the longitudinally extending sidewall is impermeable to water and the water permeable top and a water permeable bottom comprise a mesh. Preferably, the longitudinally extending sidewall is rigid.

In another embodiment, the permeable enclosure is without a fixed shape.

In another embodiment, the through-flow cartridge comprises a lower portion having apertures and an upper portion having apertures and the filter assembly further comprises at least one support structure that positions the permeable enclosure within the cavity and spaced from at least the lower apertures. Preferably, the at least one support structure retains the permeable enclosure spaced from the apertures of the lower portion and the upper portion. Accordingly, there may be an upper and a lower support structure.

In another embodiment, the at least one support structure is removable from the cartridge. Alternately, they may be formed as part of the cartridge.

In another embodiment, the support structures comprise an open web disc.

In another embodiment, the filtration media comprises at least one member selected from the group carbon, mineral stone and ceramic. The filter material may be any of those known in the art for gravity fed water filters.

In another embodiment, the household water filtration apparatus further comprises a filtered water reservoir that is less than 5 L in volume.

In another embodiment, the household water filtration apparatus comprises a container that is fabricated from glass.

Preferably, the water filtration apparatus is a portable water filtration apparatus and, more preferably, a countertop water filtration apparatus.

In accordance with another aspect of the present invention, there is provided a method for filtering water using a household water filtration apparatus, the method comprising:
(a) opening a through-flow cartridge;
(b) depositing a filter packet in the cartridge;
(c) closing the cartridge;
(d) depositing the cartridge in the household water filtration apparatus; and,
(e) passing water through the cartridge.

In one embodiment, the method further comprises removing the filter packet from the cartridge, and depositing another filter packet in the cartridge.

In another embodiment, the method further comprises placing a first support structure in the cartridge, below the filter packet.

In another embodiment, the through-flow cartridge comprises a lower portion having apertures, and the method further comprising retaining the filter packet spaced from the apertures of the lower portion. Preferably, the method further comprises placing another support structure in the cartridge, above the filter packet. In such an embodiment, the through-flow cartridge comprises an upper portion having apertures, and the method further comprises retaining the filter packet spaced from the apertures of the upper portion.

In another embodiment, the household water filtration apparatus is portable and the method further comprises transporting the household water filtration apparatus to a faucet to add water to a feed water reservoir.

In another embodiment, the method further comprises providing a water filtration apparatus with a filtered water reservoir having a volume of less than 5 L.

In another embodiment, the method further comprises opening a lid of the water filtration apparatus and subsequently opening a lid of the through-flow cartridge. For example, the through-flow cartridge may be removed from the water filtration apparatus prior to opening the lid of the through-flow cartridge. Alternately, the lid of the through-flow cartridge may be opened while the through-flow cartridge is positioned in the water filtration apparatus.

In another embodiment, the method further comprises simultaneously opening a lid of the water filtration apparatus and opening a lid of the through-flow cartridge.

In accordance with another broad aspect, the present invention provides a filter assembly for a household water filtration apparatus, the filter assembly comprising:
(a) a through-flow cartridge defining a cavity
(b) a water-permeable enclosure receivable in the cavity and housing filtration media; and,
(c) the water-permeable enclosure and the through-flow cartridge are configured to direct water into the water-permeable enclosure.

An advantage of this broad aspect is that the water entering the filter assembly is substantially prevented from bypassing the enclosure. Accordingly, most or all of the water is directed into the enclosure, and contacts the filtration media. Accordingly, most or all of the water is subjected to filtration.

In some embodiments, the through-flow cartridge is openable to access the cavity. For example, the cartridge may comprise a cup and an openable lid.

In some embodiments, the filter assembly comprises an annular gap between the cup and the water-permeable enclosure, and the water-permeable enclosure engages the through-flow cartridge to inhibit flow of water through the annular gap.

In some embodiments, the through flow cartridge comprises a cup and a lid, and the through-flow cartridge comprises at least one seating surface extending from the cup around an outer portion of the cavity, and the lid has an engagement surface that is positioned above the seating surface when the lid is in a closed position. The water-permeable enclosure comprises a flange extending from an upper portion of the water-permeable enclosure. The flange is securable between the seating surface and the engagement surface when the lid is in the closed position.

In some embodiments, the permeable enclosure comprises a water impermeable longitudinally extending sidewall, a water permeable top, and a water permeable bottom. In some such embodiments, at least one of the longitudinally extending sidewall, water permeable top, and water permeable bottom are fabricated from polylactic acid.

In some embodiments, the cup and the lid comprise mating screw threads, and the flange is held between the engagement surface and the seating surface when the lid and the cup are screwed together.

In some embodiments, the engagement surface, flange, and seating surface form a water impermeable seal.

In some embodiments, the through-flow cartridge is removably received in the household water filtration apparatus.

In accordance with another broad aspect, a filter assembly for a water filtration apparatus is provided wherein at least a portion of the container that houses the filter media is fabricated from polylactic acid.

Embodiments in accordance with this broad aspect may be advantageous because the container may be biodegradable. Accordingly, rather than discarding the container, the container may be composted. Surprisingly, it has been determined that despite deteriorating when in contact with water, such a container may have a sufficient shelf life to provide a commercial product. Typically, filter media is damp when shipped. Therefore, the container will be in contact with water during packaging, shipment, storage and use. Despite this, if the container is generally housed in a cold environment, such as a refrigerator, the shelf life of the container may be roughly equal to (or greater than) the filtration capacity of the filtration media. Accordingly, the container may be biodegradable without reducing the shelf life of the filter assembly.

In accordance with this aspect of the present invention, there is provided a filter assembly for a water filtration apparatus, the filter assembly comprising at least one container housing filtration media wherein at least a portion of the container is fabricated from polylactic acid.

In some embodiments, the container is received in a filter cartridge.

In some embodiments, the filter cartridge comprises an accessible cavity and the container is removably received in the cavity.

In some embodiments, the container comprises a through-flow cartridge. For example, the container may comprise a water impermeable longitudinally extending sidewall, a water permeable top, and a water permeable bottom and the sidewall is fabricated from polylactic acid In some embodiments, the filtration media directly contacts the container.

BRIEF DESCRIPTION OF THE DRAWINGS

These and other advantages of the present invention will be more fully and particularly understood in connection with the following description of the preferred embodiments of the invention in which.

DETAILED DESCRIPTION OF THE INVENTION

Figure 1:
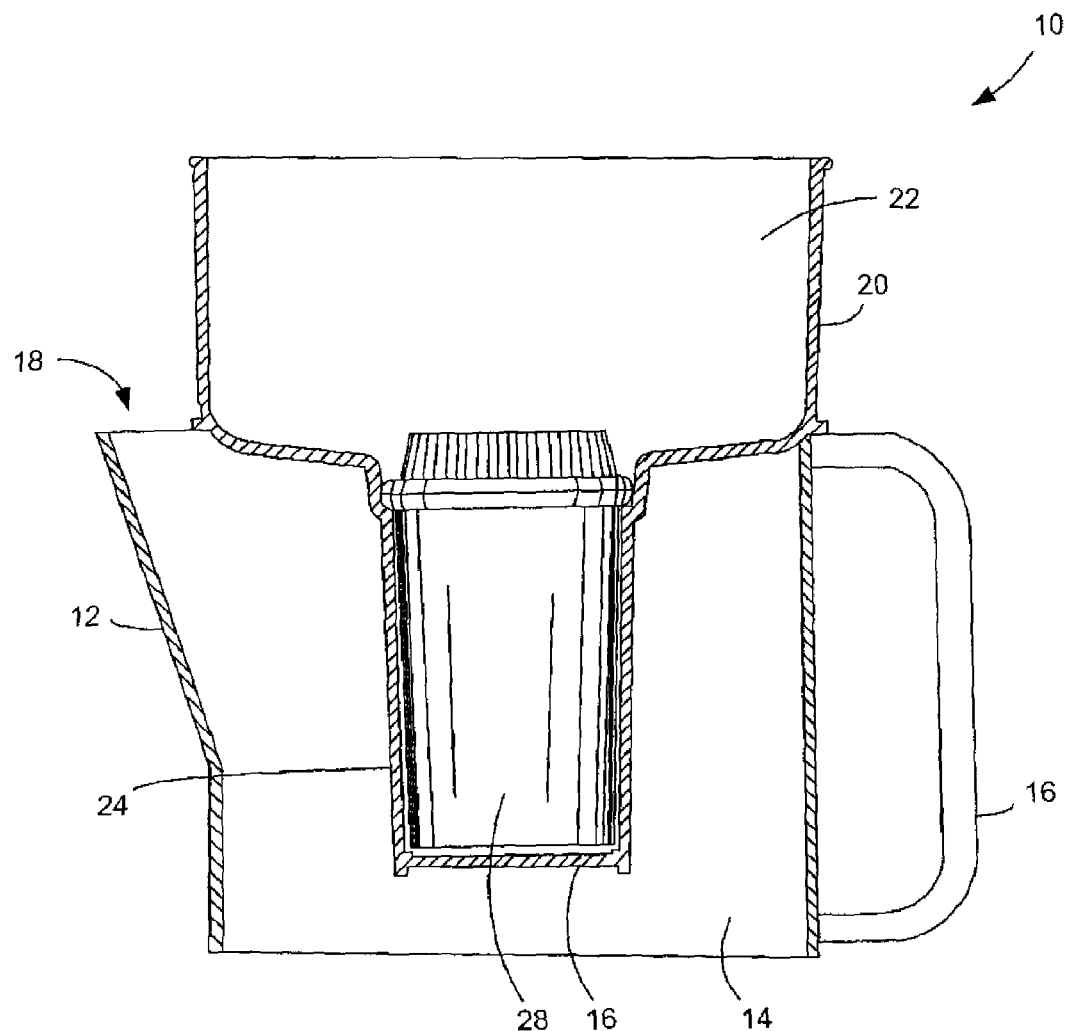
FIG. 1 is a front elevation view of a portable water treatment apparatus including a filter assembly as is known in the art.

As shown in FIG. 1, a household water treatment apparatus 10 comprises a container 12 having a filtered water reservoir 14, an optional handle 16 and an optional pour spout 18. The volume of filtered water reservoir may be 0.5-5 liters, and preferably less than 2 litres. Accordingly, household water treatment apparatus 10 may be easily carried by a user by means of handle 16 and accordingly is typically used in household environments. In such an embodiment, household water treatment apparatus 10 comprises a portable water treatment apparatus. Such a portable water treatment apparatus 10 may be stored on a counter top in a kitchen or in a refrigerator. Portable water treatment apparatus 10 is also provided with an upper portion that defines a feed water reservoir 22. The feed water reservoir may be filed with water that is to be treated by being passed, due to gravity, through filter assembly 28. Filter assembly 28 is removably receivable in household water treatment apparatus 10, such as by being slideable receivable in filter assembly holder 24. Filter assembly holder has an open or porous bottom 26 through which filtered water passes into filtered water reservoir 14.

It will be appreciated that household water treatment apparatus 10 may be of any design known in the art. Further, household water treatment apparatus 10 may be mounted to a faucet, such as in a kitchen, and not require a feed water reservoir 22. In such an embodiment, household water treatment apparatus 10 may be secured to the outlet of a faucet, such as by a screw thread, and filtered water provided when the valve to the faucet is turned on. The filter cartridge of this invention may be used with any such household water treatment apparatus 10 and, is preferably used with a counter top water filtration apparatus as exemplified in FIG. 1.

Figure 2:
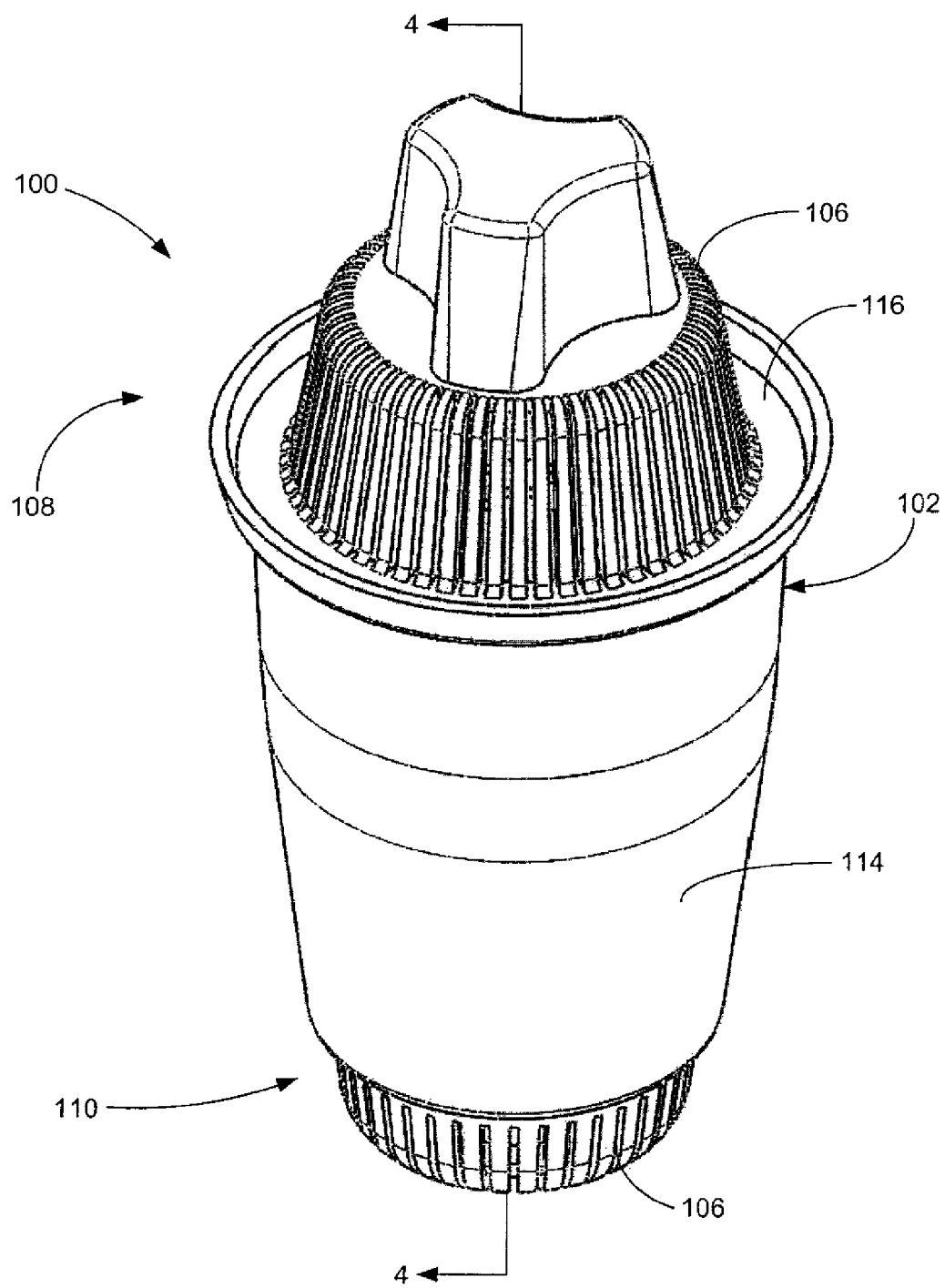
FIG. 2 is a perspective drawing of an embodiment of a filter assembly of the present invention.

Referring to FIG. 2, an embodiment of a filter assembly 100 of the present invention is shown. Filter assembly 100 may be sized to be received in or secured to any household water filtration apparatus 10, such as the one exemplified in FIG. 1.

Figure 3:
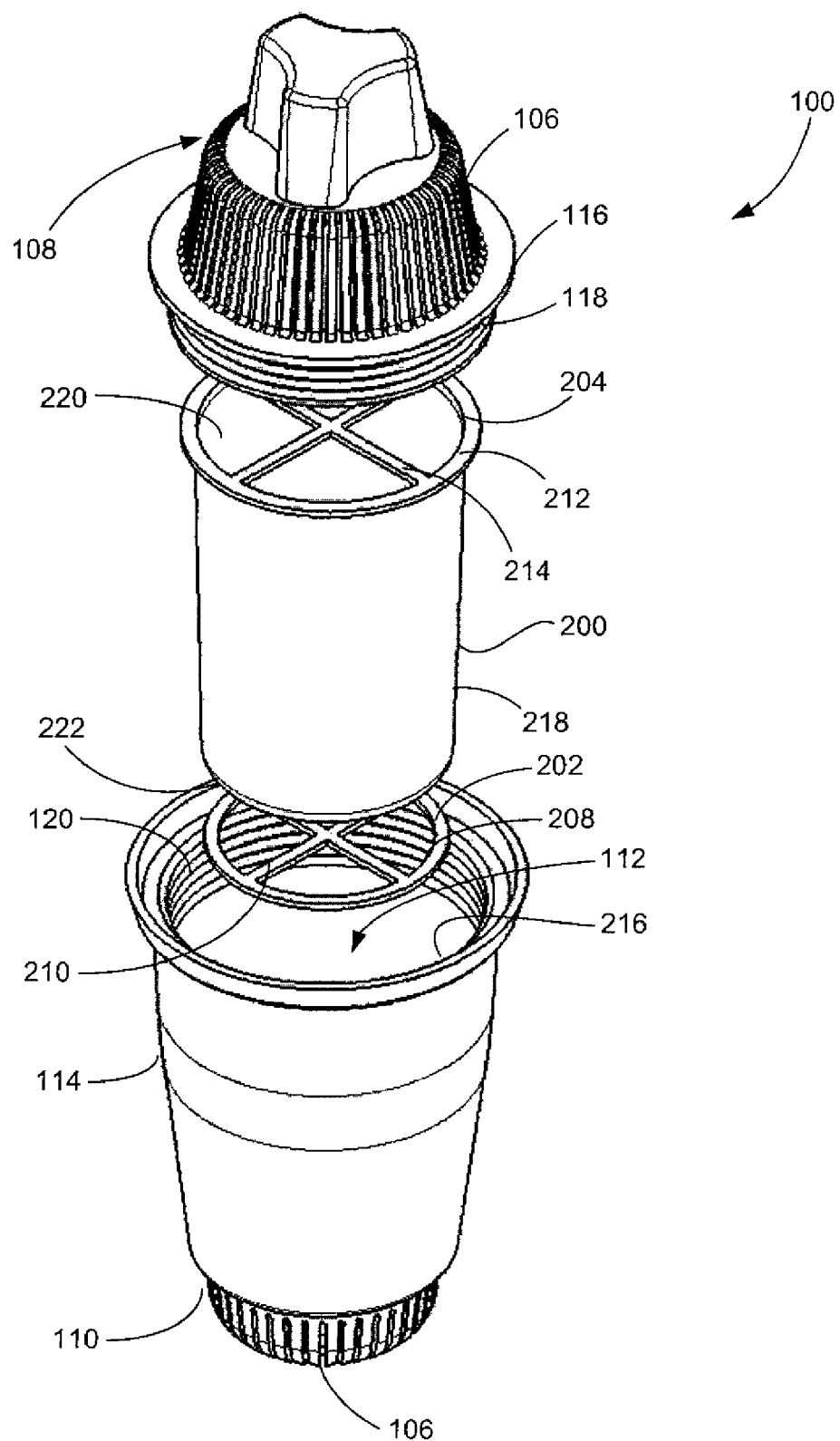
FIG. 3 is an exploded view of the filter assembly of FIG. 2.

Referring to FIGS. 2 and 3, filter assembly 100 comprises a cartridge 102, and an enclosure or filter packet 200. Cartridge 102 is a through-flow cartridge. In the embodiments shown, through-flow is achieved via a plurality of apertures 106 in top portion 108 and in bottom portion 110 of cartridge 102. In other embodiments, however, through-flow may be achieved in other ways. For example, one or both of top and bottom portions 108, 110 may have a porous wall and/or they may be generally open. In particular, as filter media is retained by permeable enclosure 200, top and bottom portions 108, 110 need not be designed to retain filtration media within cartridge 102 (e.g., by having openings smaller than most of the particulate material of the filter media).

Cartridge 102 has an accessible cavity 112. That is, a user may access cavity 112 in order to insert and remove an enclosure 200 into cavity 112. For example, cartridge 102 may have one part that is removable from the rest of cartridge 102, or moveable with respect to the rest of cartridge 102, to provide an opening through which an enclosure 200 may be replaced.

Figure 4:
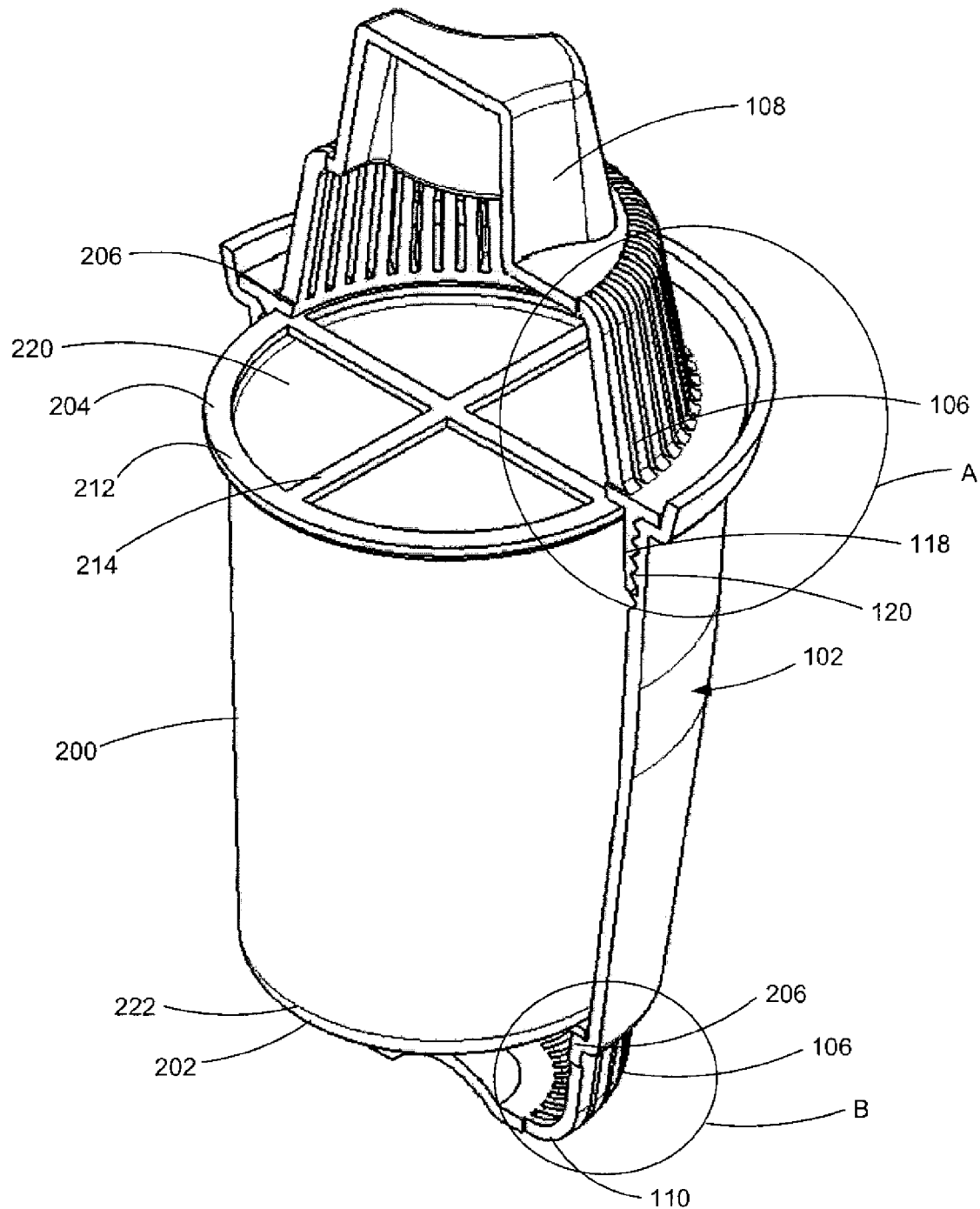
FIG. 4 is a partial longitudinal cross-section along the line 4-4 of the embodiment of FIG. 2.
Figure 5:
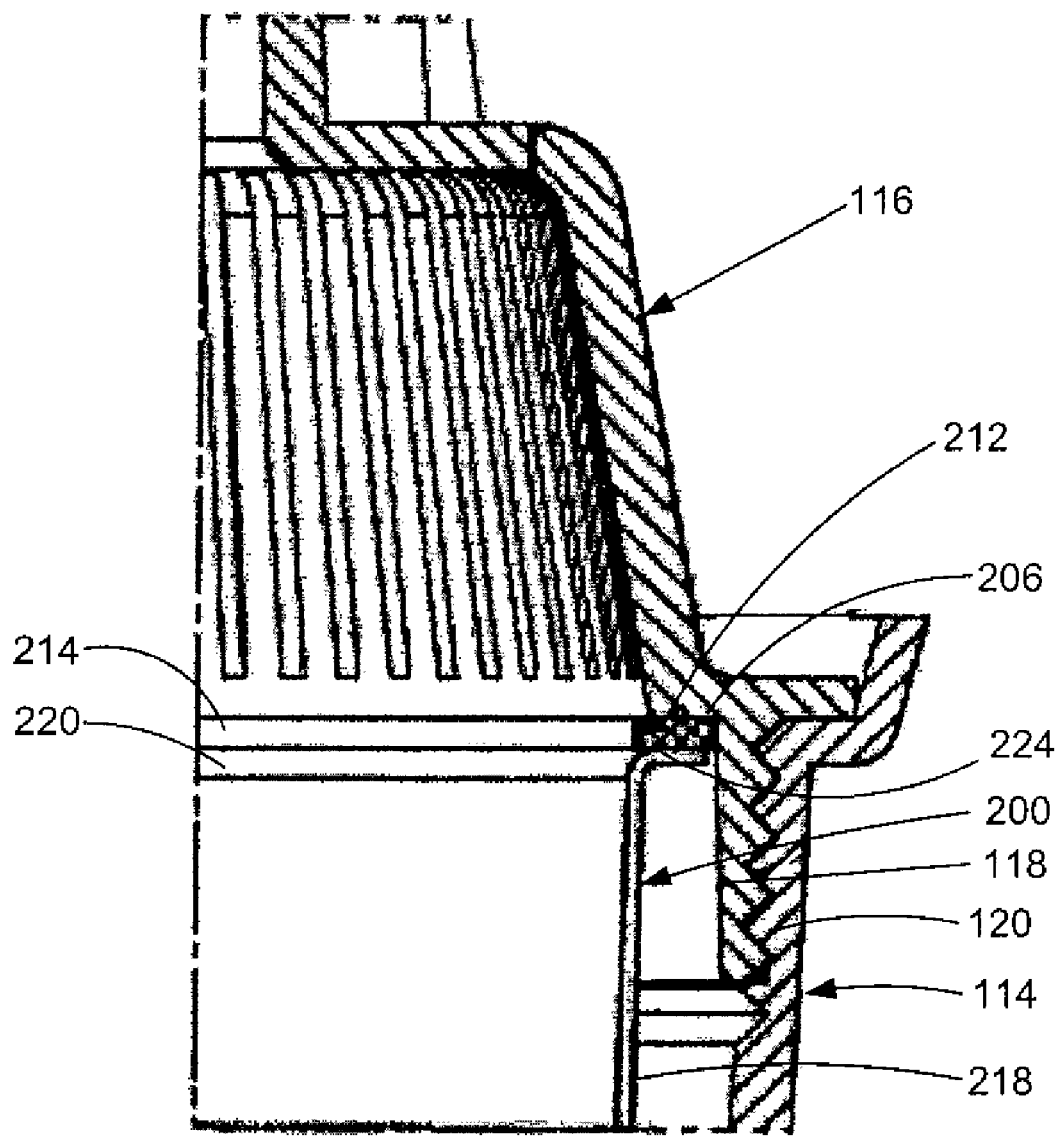
FIG. 5 is an enlarged cross-section of area A of FIG. 4.
Figure 6:
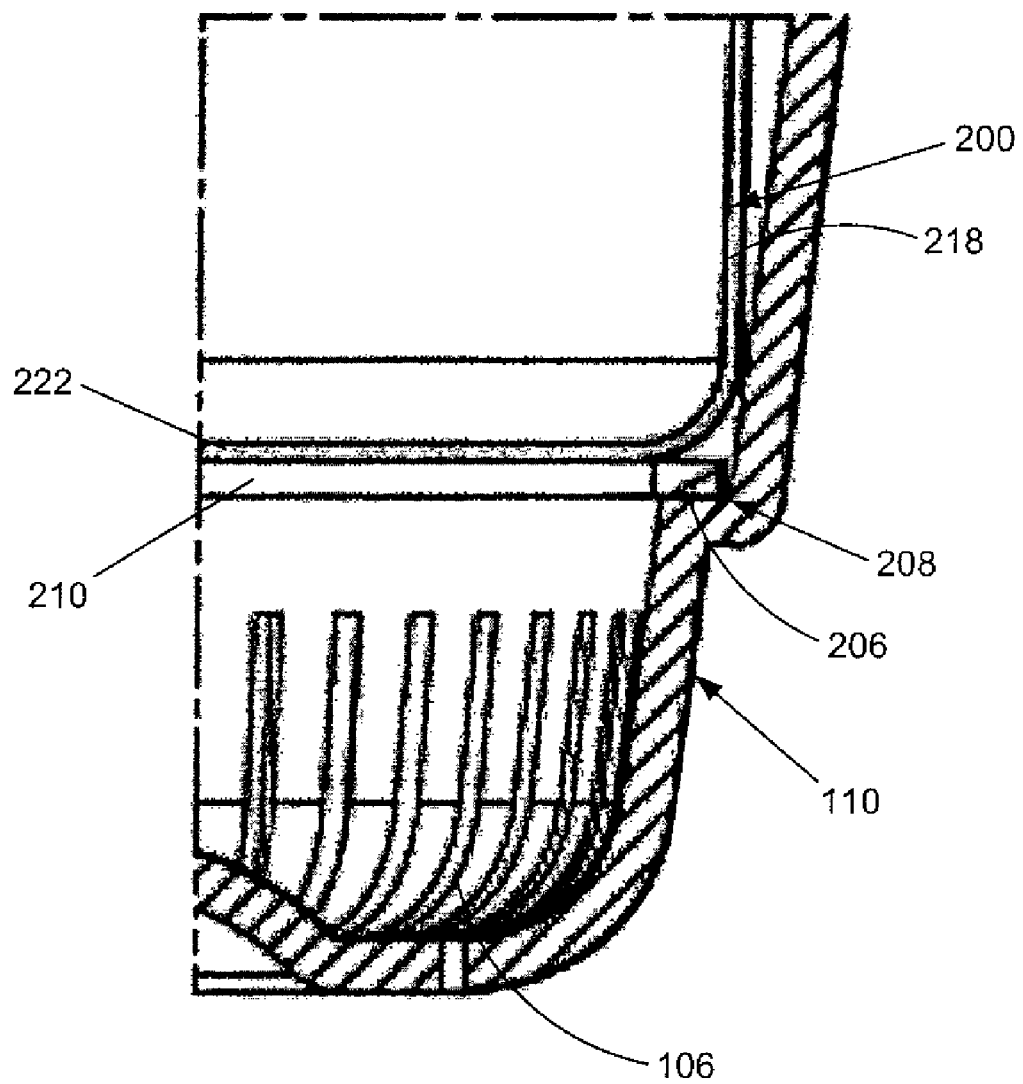
FIG. 6 is an enlarged cross-section of area B of FIG. 4.

As exemplified in FIGS. 2-4, cartridge 102 comprises a cup 114 and a lid 116. As used herein, the term 'cup' refers to any structure that is sized to fit into a household water treatment apparatus and, accordingly, is typically longitudinally extending and has a base portion and at least one side wall. The term 'lid' refers to any structure that may either partially or fully fit on the top portion of a cup. It will be appreciated that in other embodiments, lid 116 may be non-removably secured to cup 114 and bottom portion 110 may be removable. Alternately, or in addition, cup 114 may be dividable into two portions, such as by one portion, e.g., a top half, pivoting or being removable from another portion, e.g., a lower half.

Accordingly, lid 116 may be either removable from or moveable relative to cup 114, in order to provide access to cavity 112. For example, cup 114 and lid 116 may have mating screw threads 118, 120, which may be screwed together or unscrewed by a user to obtain access to cavity 112. In other embodiments, cup 114 and lid 116 may mate via a snap-fit, a bayonet fit, external latch or the like. Alternately, lid 116 may be pivotally mounted to cup 114. Once disassembled, one or both of cup 114 and lid 116 may be washed, such as by placing them in a dishwasher. In other embodiments, cup 114 and lid 116 may mate by other means. Alternately, lid 116 may be pivotally mounted to cup 114 (not shown). An advantage of such an embodiment is that lid 116 may not be misplaced by a user.

In another embodiment, cartridge 102 may not comprise a cup and a lid, and may be any other through-flow structure which can be removably received in or secured to a portable water filtration apparatus, and which has an accessible cavity for removably receiving enclosure 200. For example, cartridge 102 may comprise a container, for example a hollow cylinder, having a permanently open slot or opening that provides access to cavity 112.

Enclosure 200 is removably receivable in cavity 112. That is, a user may insert enclosure 200 into and remove enclosure 200 from cavity 112. Enclosure 200 is water permeable, and houses or contains a filtration media. Enclosure 200 may be of any size that is receivable in cavity 112.

Enclosure 200 may be fabricated from a mesh, which may be either woven, or non-woven, and is preferably non-woven. Preferably, the mesh may be formed from hydrophobic filaments, for example polypropylene and/or nylon. It will be appreciated that the use of hydrophobic material is useful for preventing or minimizing degradation of enclosure 200 by absorption of water. In alternate embodiments, the mesh may be fabricated from other plastics or natural fibres, such as silk. In some embodiments, enclosure 200 is fabricated from polylactic acid (PLA) as will be discussed further hereinbelow.

Enclosure 200 may be sufficiently rigid to retain a fixed shape. In such embodiments, enclosure 200 may be cylindrical, for example, as shown in FIGS. 2 and 3. In other embodiments, enclosure 200 may be deformable, soft-sided, or without a fixed shape. For example, enclosure 200 may have the same flexibility as a tea bag and, accordingly, need not have a fixed shape.

Enclosure 200 houses or contains one or more filter media. The filtration media may be any substance used in the household water filter art. In some particular embodiments, the filtration media may be granulated carbon. In embodiments wherein the filtration media is particulate, which is preferred, the pores or openings of the mesh are sized such that most, and preferably all or essentially all of the particles are retained in enclosure 200. For example, the particulate filtration media may be 5 mm in diameter, such as for coarse granular carbon to 0.25 mm, such as for very fine granular carbon, and the pores of the mesh may be 0.5 mm×0.5 mm (for a large mesh) to 0.01 mm×0.01 mm (for a very fine mesh) and, preferably, about 0.02 mm×0.02 mm.

Preferably, enclosure 200 in retained in a position that is spaced from apertures 106, such that enclosure 200 does not clog, obstruct, or block apertures 106. In such embodiments, filter assembly 100 may comprise at least one support structure. For example, as shown in FIGS. 3-6, lower support structure 202 may be a disc with an open web structure. The disc comprises an outer ring 208 and a plurality of radial arms 210. The disc provides a support structure on which enclosure 200 may be received, and retained in a spaced relationship from apertures 106 of bottom portion 110. In other embodiments, support structure 202 may be, for example, a plate having apertures a ring, a cross, a bar, or any other structure that retains enclosure 200 in a position that is spaced apart from apertures 106.

In some embodiments, lower support structure 202 may be placed inside cavity 112 prior to depositing enclosure 200, in order to space enclosure 200 from apertures 106 in bottom portion 110. For example, support structure may be integrally formed with bottom portion 110 or it may be separately molded and removably or non-removably inserted in cartridge 102. Accordingly, if lower support structure 202 is not formed as part of cup 114, cup 114 is provided with a member to position lower support member 202 above apertures 106 and/or lower support member 202 is provided with members (e.g., feet) to position lower support member 202 above apertures 106. Thus, lower support member 202 may be retained by a friction fit with inner surface 216 of cup 114 or a lip 206 may be provided on which lower support structure 202 may be seated.

Alternately, or in addition, upper support structure 204 may be placed in cavity 112 after depositing enclosure 200, in order to retain enclosure 200 spaced from apertures 106 in top portion 110. Upper support structure 204 may be the same or different from lower support structure 202. Preferably, upper support structure 204 comprises a disc comprising an outer ring 212 and a plurality of radial arms 214. If upper support structure 204 is not formed as part of cup 114, cup 114 and/or lid 116 are provided with a member to position upper support structure 204 below apertures 106 and/or upper support structure 204 is provided with members (e.g., feet) to position upper support structure 204 below apertures 106. Thus, upper support structure 204 may be retained by a friction fit between outer ring 212 and inner surface 216 of cup 114 or a lip 206 may be provided on which lower support structure 202 may be seated. In other embodiments, support structures 202, 204 may be integral with enclosure 200.

In the embodiment of FIGS. 1-8, enclosure 200 comprises a longitudinally extending body having a rigid sidewall 218, a water permeable top 220 and a water permeable bottom 222. Sidewall 218 has a outer radial band 224 that has a diameter so as to be positioned beneath sidewall 218. Sidewall 218 has a longitudinal extent such that when enclosure 200 is seated on lower support member 202, band 224 seats upper support structure 204 against lip 206. Thus enclosure 200 is secured in position in a spaced relationship to apertures 106 of lid 116 and lower portion 110. It will also be appreciated that if sidewall 218 is not water permeable, then water cannot bypass the filtration media in enclosure 200 but must pass through the filtration media. In other embodiments, a radial band 224 may not be provided and enclosure 200 may be positioned in cavity 112 between lower support member 202 and upper member 204. As noted previously, in an alternate embodiment, enclosure 200 may be deformable, soft-sided, or without a fixed shape and accordingly, in such an embodiment sidewalls 218 made of a mesh material may be provided.

Figure 9A:
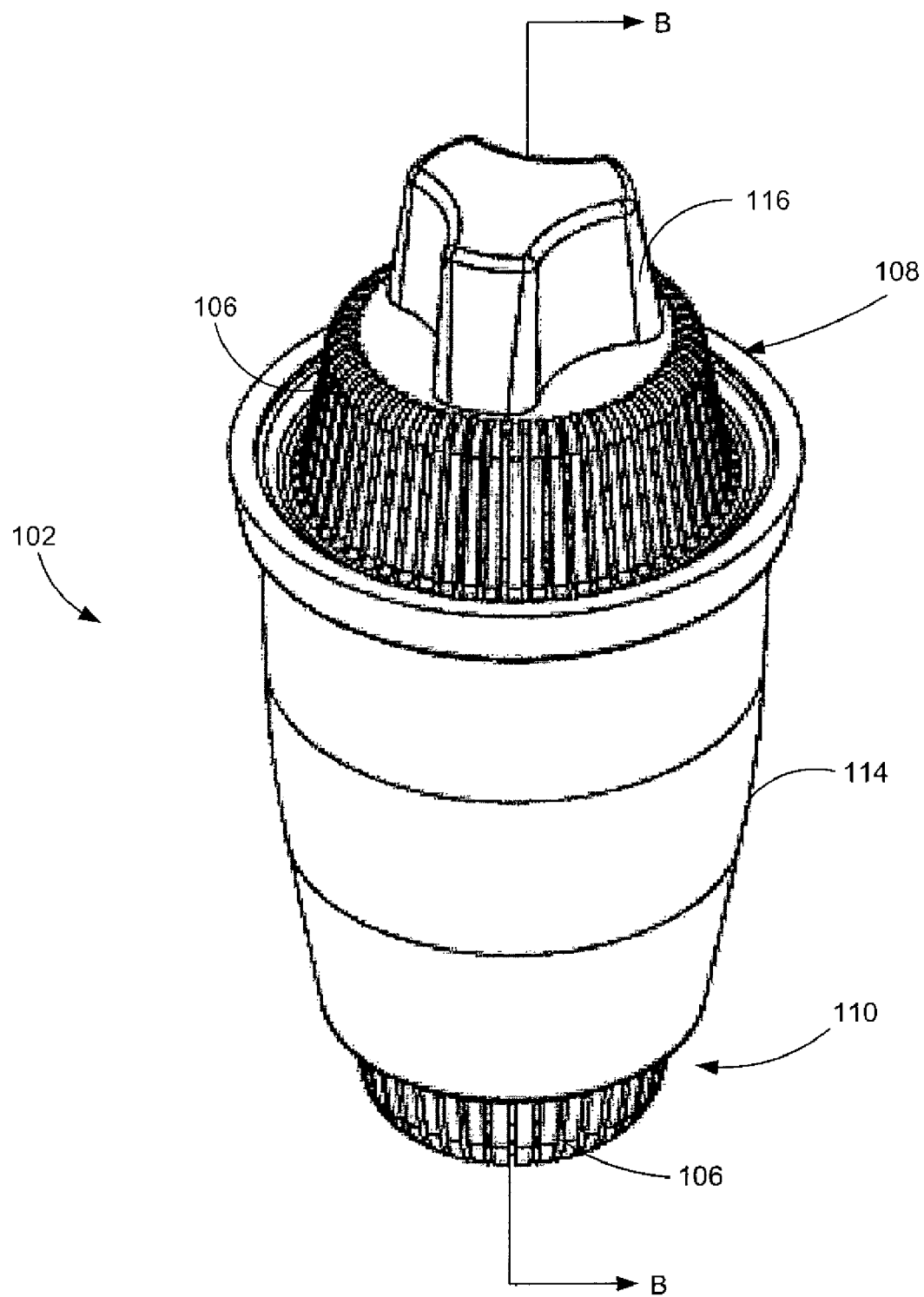
FIG. 9A is a perspective drawing of an alternate embodiment of a filter assembly of the present invention.
Figure 9B:
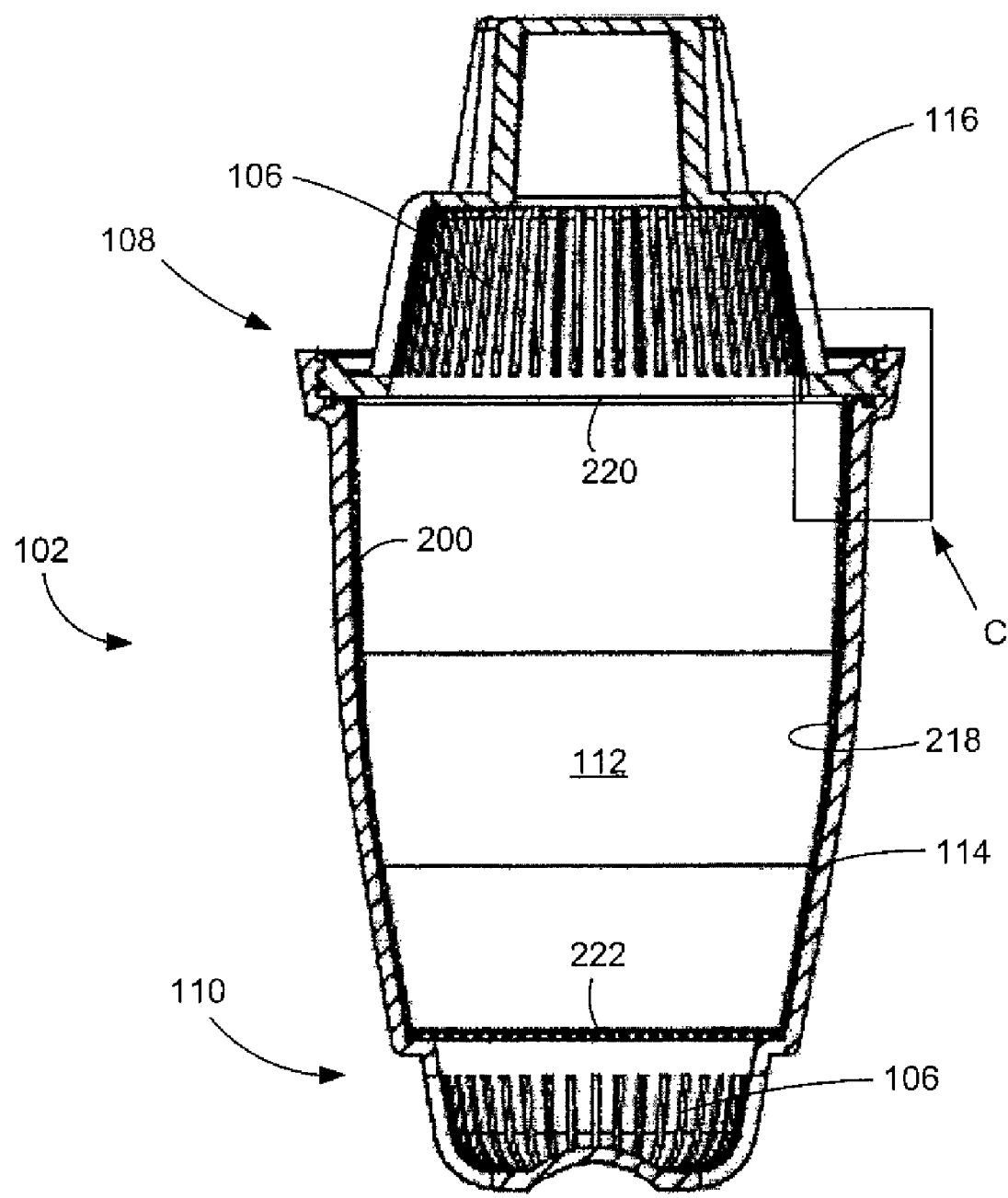
FIG. 9B is a cross section taken along line B-B in FIG. 9A.
Figure 9C:
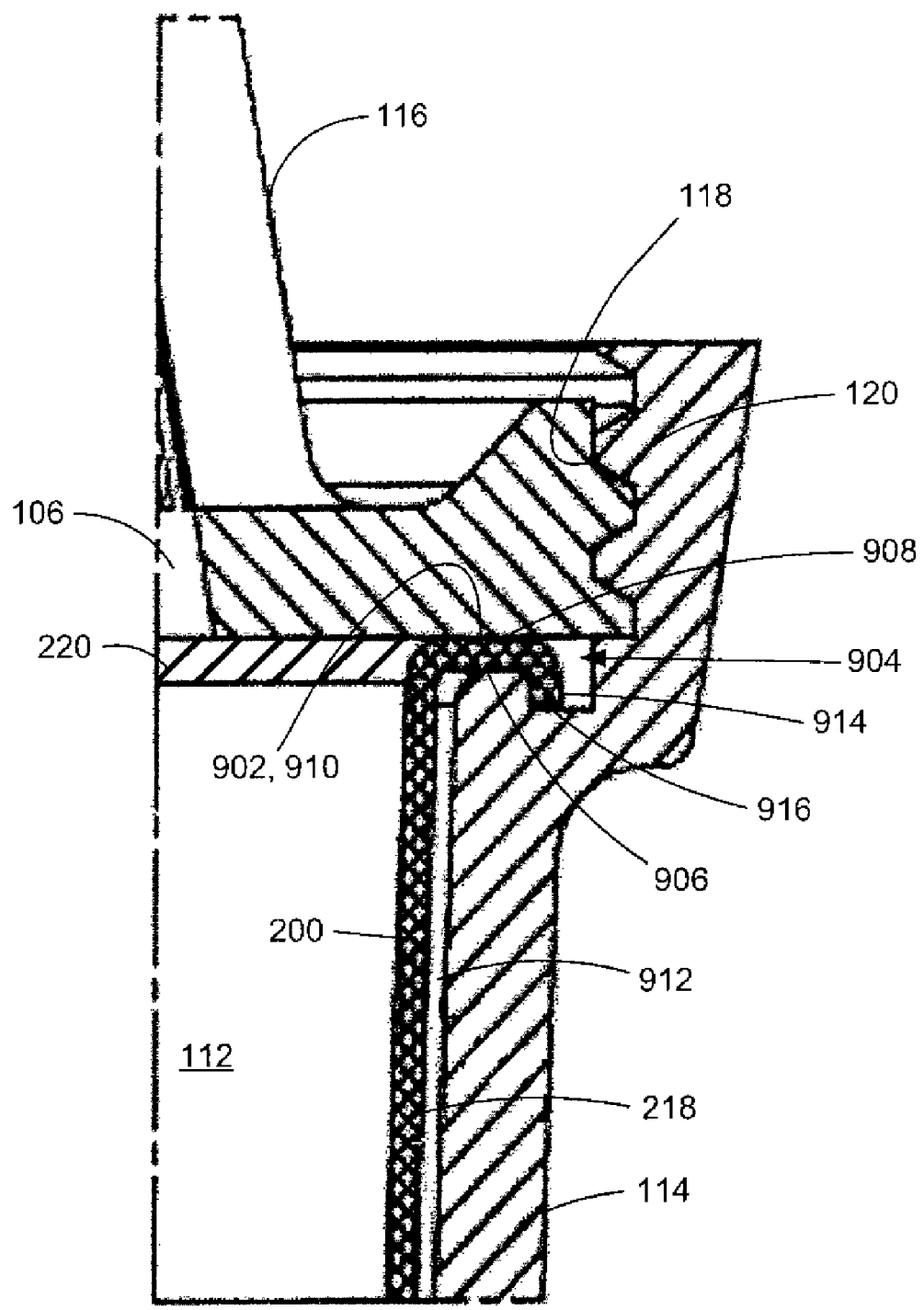
FIG. 9C is an enlarged drawing of the region shown in box C in FIG. 9B.

An alternate embodiment of through-flow cartridge 102 is shown in FIGS. 9A-9C. In this embodiment, cartridge 102 comprises a cup 114 and a lid 116, which define a cavity 112, and a water permeable enclosure 200 housing a filtration media is receivable in the cavity 112, as described hereinabove. Furthermore, in this embodiment, the water permeable enclosure and the through-flow cartridge 102 are configured to direct water into the enclosure For example, at least a portion 902 of the water permeable enclosure 200 may engage at least a portion 904 of the through-flow cartridge 102 to direct water into the enclosure. In the exemplified embodiment shown, the portion 904 of the through flow cartridge 102 comprises a seating surface 906, that extends from the cup 114 around an outer portion of the cavity 112, and an engagement surface 908 of the lid 116, which is positioned above the seating surface 906 when the lid 116 is mounted to the cup 114. The portion 902 of the water permeable enclosure comprises a flange 910, which extends from the upper portion of the permeable enclosure 200. The flange 910 is secured between the seating surface 906 and the engagement surface 908, such that water entering the through-flow cartridge, for example through apertures 106, is directed into the water permeable enclosure 200. That is, the flange 910 is generally sandwiched between the seating surface 906 and the engagement surface 908, such that the water is inhibited from bypassing the enclosure 200, for example by passing over the top of the enclosure 200 and through an annular gap 912 defined between the cup 114 and the enclosure 200.

Furthermore, in the embodiment shown, the enclosure 200 comprises a water impermeable longitudinally extending sidewall 218, a water permeable top 220, and a water permeable bottom 222, as described hereinabove. For example, the longitudinally extending sidewall 218 may be substantially solid and rigid, and the top 220 and the bottom 222 may comprise a mesh. Accordingly, water entering the cartridge passes through the water permeable top 220 and into the enclosure 200, and as the sidewall 218 is water impermeable, the water is forced to pass through the filtration media in the enclosure 200, in order to pass out of the water permeable bottom 222.

It is preferable that the flange 910, seating surface 906, and engagement surface 908 provide a water-tight or water-resistant seal; however, it will be appreciated that some water may pass through the joints between the flange 910, seating surface 906, and engagement surface 908.

In the embodiment shown, the seating surface 906 is a single seating surface extending about the entire circumference of the cavity 112. However, in alternate embodiments, the seating surface 906 may comprise a plurality of seating surface portions, each extending about only a portion of the circumference of the cavity 112. Furthermore, in the embodiment shown, the engagement surface 908 comprises a portion of the bottom surface of the lid 116 that is continuous with and visually indistinguishable from the remainder of the lid 116. However, in alternate embodiments, the engagement surface 908 may be discontinuous with the remainder of the lid 116 and visually distinguishable therefrom. For example, the engagement surface 908 may comprise a downwardly extending rib, which extends about the periphery of the bottom surface of the lid (not shown). Furthermore, the engagement surface 908 may comprise a plurality of engagement surface portions, each extending about only a portion of the periphery of the lid 116.

As exemplified in the embodiment shown, the enclosure 200 preferably further comprises a lip 914 extending downwardly from the outer periphery of the flange 910. Further, the cup 114 preferably comprises a recess 916 extending around the seating surface 906. The lip 914 is configured to be received in the recess 916, to aid in securing the flange 910 between the seating surface 906 and the engagement surface 908.

In alternate embodiments, the portion 902 of the enclosure 200 may engage the portion 904 of the cartridge 102 in another manner. For example, an inner wall of the cup may comprise a recess or notch extending about the circumference thereof, and an outer wall of the enclosure may comprise a rib or lip that is receivable in recess (not shown). Further, in some embodiments, a gasket or other sealing member may be provided between the portion 902 of the enclosure and the portion of the cartridge 904. In such embodiments, the portions 902, 904 may be indirectly engaged, via the sealing member.

As exemplified in the embodiment of FIGS. 9A-9C, the lid 116 is preferably removably secured to the cup 114. That is, the lid 116 and the cup 114 comprise mating screw threads, 118, 120, as described hereinabove. Accordingly, the lid 116 may be unscrewed from the cup 114 to access the cavity 112, for example in order to replace the enclosure 200, as described hereinabove. Further, when an enclosure 200 is placed in the cup 114, and the lid 116 is screwed onto the cup 114, the flange 910 is secured between the seating surface 906 and the engagement surface 908.

In alternate embodiments, the lid 116 may be permanently or semi-permanently secured to the cup 114. For example, in the manufacturing process, after the enclosure 200 has been placed in the cup 114, the cup 114 and the lid 116 may be secured together such that an end user may not access the cavity 112.

As previously mentioned, in the above-described embodiments, filter assembly 100 may be removably receivable in a household water filtration apparatus. For example, in some embodiments, filter assembly 100 may be removed from a household water filtration apparatus by sliding cartridge 102 from a filter assembly holder, such as filter assembly holder 24. Alternatively, filter assembly 100 may be removably receivable in household water filtration apparatus in another suitable manner. In any such embodiment, filter assembly 100 is positioned in the fluid flow path to the filtered water reservoir 14. Preferably, it is positioned between a feed water reservoir 22 and a filtered water reservoir 14.

Figure 7:
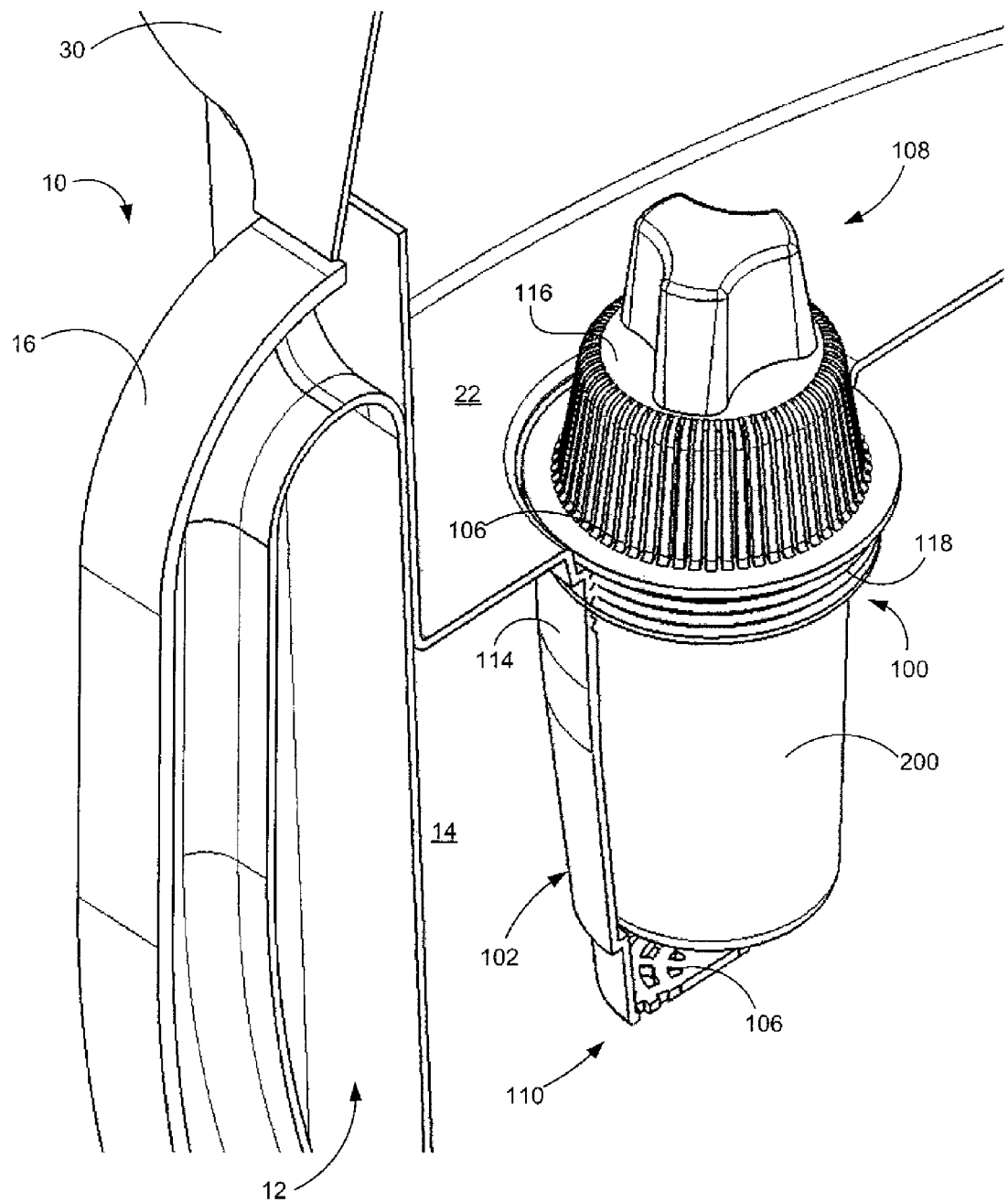
FIG. 7 is a partial longitudinal cross-section along line 4-4 of the embodiment of FIG. 2, shown together with a portable water treatment apparatus.
Figure 8:
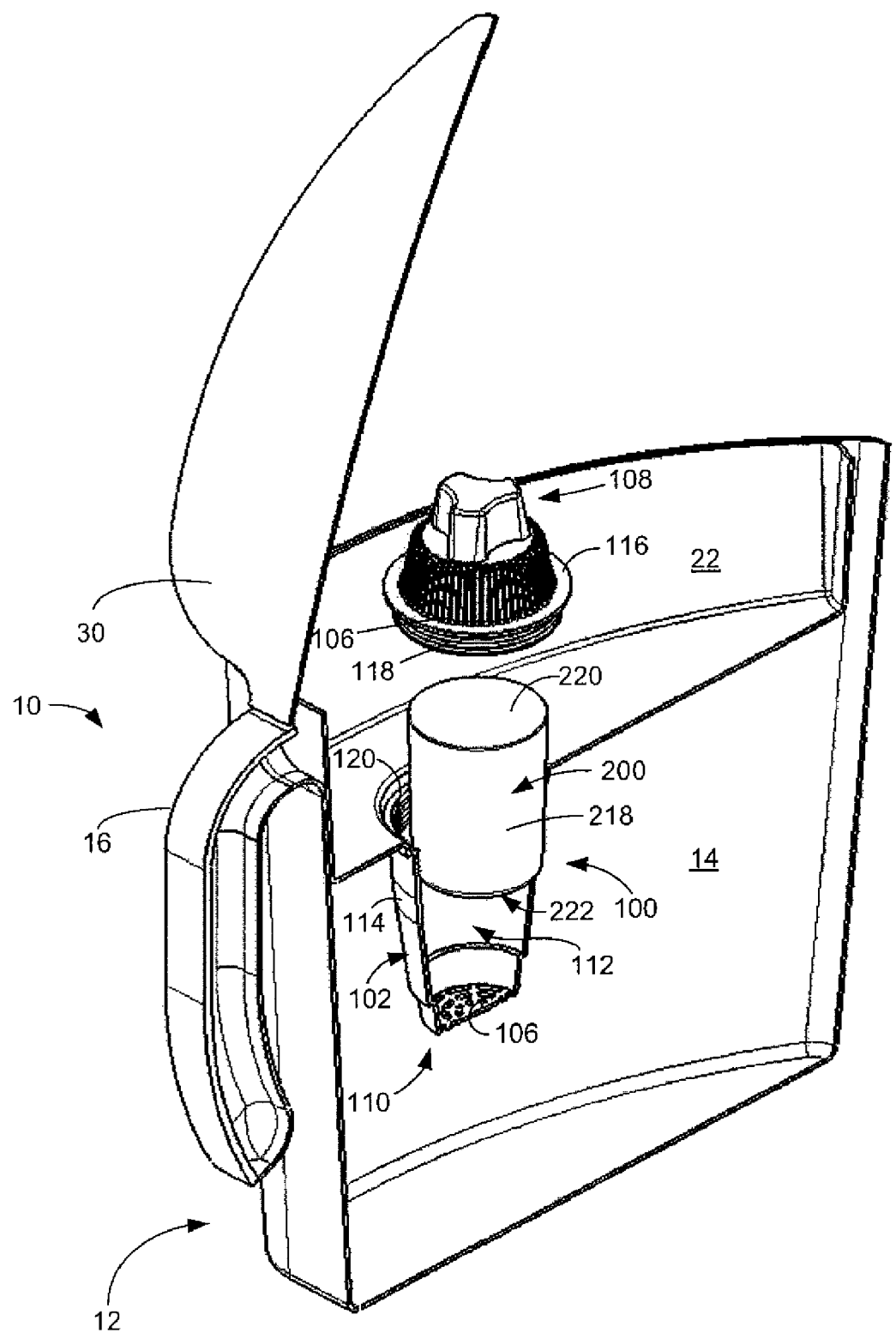
FIG. 8 is a partial longitudinal cross-section along line 4-4 of an alternate embodiment of FIG. 2 wherein a portion of the cartridge is secured to the water treatment apparatus, shown together with a portable water treatment apparatus, with a lid of a cartridge opened, and with a permeable enclosure partially removed from the cartridge.

In alternate embodiments, as shown in FIGS. 7 and 8, at least a portion of filter assembly 100 may be permanently secured to container 12. As used herein, the term 'permanently secured' indicates that during normal use, a user may not remove the portion of filter assembly 100 from container 12. In such an embodiment, filter assembly holder 24 may not be required. As shown in FIGS. 7 and 8, this may be accomplished by permanently securing at least a portion of cartridge 102 to household water filtration apparatus 10. For example, in embodiments wherein cartridge 102 comprises a cup 114 and a lid 116, cup 114 may be integrally formed with a part household water filtration apparatus 10, or may subsequently be secured thereto by mechanical attachment members such as a screw thread, a latch or the like, or by an adhesive or welding or the like.

In such embodiments, lid 116 is movable from the top of cup 114 while cup 114 is in position in water filtration apparatus 10, such that permeable enclosure 200 may be removed from cartridge 102, as shown in FIG. 8. Lid 116 may be removably mounted thereto or moveably mounted thereto by any method disclosed herein. If the water filtration apparatus has a feed water reservoir 22 with a lid 30, then it will be appreciated that lid 116 may be removed after lid 30 of feed water reservoir 22 is opened. Alternately, lid 116 may be openable when lid 30 is opened, such as if an arm extends from lid 30 to lid 116. In such a case, lid 116 may be secured in position by such an arm and/or a snap fit.

According to another broad aspect of the present invention, the container housing the filtration media may be fabricated from polylactic acid. That is, in the embodiments shown, wherein an enclosure 200 houses the filtration media, it is preferable that the enclosure 200 is fabricated from polylactic acid. For example, in embodiments wherein the enclosure 200 comprises a water impermeable longitudinally extending sidewall 218, and a water permeable top 220 and bottom wall 222, at least one of the sidewall 218, top wall 220, and bottom 222 wall may be fabricated from polylactic acid. For example, the sidewall may be made from a solid sheet of polylactic acid, and the top wall and bottom wall may be made from a polylactic acid mesh. This aspect may be used by itself or with any other embodiment disclosed herein. For example, the container may be cartridge 102 or enclosure 200.

Embodiments wherein the enclosure 200 is fabricated from polylactic acid may be particularly advantageous when the cartridge 102 is configured to be openable, as described hereinabove. In such embodiments, when the filtration media is spent, the cartridge 102 may be opened, and the enclosure 200 may be removed from the cartridge 102. The enclosure 200 may then be discarded with "green waste", for example it may be sent to a compost site, such that it may biodegrade.

Furthermore, in some embodiments, the filter cartridge 102 may not be openable. That is, the enclosure 200 may be sealed inside the filter cartridge 102. In such embodiments, the filter cartridge 102 may also be fabricated from polylactic acid. Accordingly, when the filtration media is spent, the entire filter assembly 100 may be discarded with "green waste", such that it may biodegrade.

In alternate embodiments, the filter cartridge 102 itself may be the container for the filtration media, and may be fabricated from polylactic acid. That is, the filter cartridge 102 may directly house the filtration media, and an enclosure 200 may not be provided. Accordingly, when the filtration media is spent, the entire filter cartridge 102 may be discarded with "green waste", such that it may biodegrade.

In all such embodiments, it is preferred that the filter media is in contact with the portion of the container made from polylactic acid.

A method of filtering water using a portable water filter apparatus will now be described. The method may be carried out using filter assembly 100, as exemplified in FIGS. 2-6, or may be carried out with another filter assembly as described herein. In a first step, a user may obtain a flow-through cartridge, for example cartridge 102 described hereinabove. The through flow cartridge may be permanently secured to the portable water filtration apparatus, or may be removably received therein. The user may then open the cartridge, if it is not acquired in an open condition, for example by unscrewing a lid. A filter member, for example a filter packet comprising enclosure 200 housing filtration media, may then be placed inside the cartridge. When the filter member has been placed inside the cartridge, the user may then close the cartridge.

The user may wish to ensure that the filter member is retained in a position that is spaced apart from any apertures in either or both of the top and bottom portions of the cartridge. Thus, in one embodiment, prior to and/or after placing the filter member in the cartridge, the user may place one or more support structures in the cartridge. Alternatively, as described hereinabove, the cartridge may be formed with integral support structures, and thus the user may not need to position any support structures.

In alternate embodiments, the cartridge may be structured such that the cavity may be accessed without a step of opening or closing. For example, as mentioned hereinabove, the cartridge may comprise a slot or opening that remains open. In such an embodiment, the user may insert the enclosure into the cartridge, without opening or closing the cartridge.

If the cartridge is removably received in the portable water filtration apparatus, the cartridge may be deposited into a portable water filtration apparatus either before or after the filter member has been placed in the cartridge. In alternate embodiments, the cartridge may be permanently secured in the water filtration apparatus and the filter member replaced while the cartridge is in position. Such an apparatus may be a jug or other container, for example, having a funnel or holder 24 in which the cartridge is to be placed (see for example FIG. 1), or having the cartridge permanently secured thereto. Alternatively, such an apparatus may be a fitting for a water faucet, having an encasement in which the cartridge will be housed. In other embodiments, the portable water filtration apparatus may be another type of household or countertop water filtration apparatus.

When the cartridge has been placed in the household water filtration apparatus and the filter member has been replaced, or when the permanently secured cartridge has been closed with a replacement filter member therein, water may be passed through the cartridge, preferably by gravity feed. This may be done, for example, by pouring water over the cartridge (e.g., filling a feed water reservoir above the cartridge), or by turning on a faucet if the cartridge is provided in the flow line.

As the water filtration apparatus is used, the filtration media may become spent. For example, with typical household use, the filtration media may become spent after a period of about 2-4 months. When this occurs, the user may replace the filter member with another filter member. In order to replace the filter member, the user may optionally remove the cartridge from the household water filtration apparatus, open the cartridge, remove the filter member (enclosure 200), deposit another filter member into the cartridge, close the cartridge, and optionally return the cartridge to the water filtration apparatus. Alternately, the user may open the cartridge while the cartridge is in position in the water filtration apparatus and then replace the filter member.

Thus, embodiments of the present invention provide a water filter assembly and a method for filtering water that allows for cost effective, and less wasteful replacement of spent filtration media. Embodiments of the present invention may be advantageous because as the filtration media becomes spent, the permeable enclosure may be removed from the cartridge and replaced, without requiring the replacement of the entire cartridge.

It will be appreciated that certain features of the invention, which are, for clarity, described in the context of separate embodiments or separate aspects, may also be provided in combination in a single embodiment. Conversely, various features of the invention, which are, for brevity, described in the context of a single embodiment or aspect, may also be provided separately or in any suitable sub-combination.

Although the invention has been described in conjunction with specific embodiments thereof, if is evident that many alternatives, modifications and variations will be apparent to those skilled in the art. Accordingly, it is intended to embrace all such alternatives, modifications and variations that fall within the spirit and broad scope of the appended claims. In addition, citation or identification of any reference in this application shall not be construed as an admission that such reference is available as prior art to the present invention.

I claim:

1. In a water pitcher having a feed water reservoir, a removable filter assembly for filtering water from said feed water reservoir and a filtered water reservoir, wherein said removable filter assembly is positioned in a filter assembly holder between said filtered water reservoir and said feed water reservoir;

the removable filter assembly comprising:
a through-flow cartridge comprising a cup having apertures in a lower portion thereof and defining a cavity, and a lid having apertures therein, wherein the lid is removably, rotatably securable to the cup such that the through-flow cartridge is openable to access the cavity, and the through-flow cartridge comprises at least one seating surface extending from the cup around an outer portion of the cavity, and the lid has an engagement surface that is positioned above the seating surface when the lid is in a closed position; and
a water-permeable enclosure that is removably receivable in said cavity and contains granular filtration media therein, the water-permeable enclosure having a water impermeable longitudinally extending sidewall, an upper water inlet and a lower water outlet, wherein the water-permeable enclosure is a replaceable sealed unit other than the upper water inlet and the lower water outlet; and, the water-permeable enclosure comprising a flange extending from an upper portion of the water-permeable enclosure, the flange securable between the cup and the lid and forming a water-tight seal, said water-permeable enclosure being secured between said lid and said cup in such a way that water entering the filter assembly cannot bypass the filtration media contained in said water-permeable enclosure water, but must pass through said upper inlet, then said filtration media and out through said lower water outlet; wherein, water flows by gravity from said feed water reservoir, through said filter assembly, and into said filtered water reservoir, wherein, once the filtration media becomes spent, the water-permeable enclosure may be removed from the cartridge and replaced, without requiring the replacement of the entire cartridge.

2. The water pitcher of claim 1 wherein at least a portion of said filter assembly is fabricated from polylactic acid.

* * * * *